(12) United States Patent
Barnes et al.

(10) Patent No.: US 8,873,967 B2
(45) Date of Patent: Oct. 28, 2014

(54) OPTICAL INTERCONNECTION MODULES FOR HYBRID ELECTRICAL-OPTICAL NETWORKS

(75) Inventors: Ray S. Barnes, Hickory, NC (US); Robert W. Dennis, Hickory, NC (US); Alan W. Ugolini, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 592 days.

(21) Appl. No.: 12/288,231

(22) Filed: Oct. 17, 2008

(65) Prior Publication Data

US 2010/0098428 A1   Apr. 22, 2010

(51) Int. Cl.
*H04B 10/12*   (2006.01)
*G02B 6/44*   (2006.01)

(52) U.S. Cl.
CPC .......... *G02B 6/4453* (2013.01); *G02B 6/4452* (2013.01)
USPC .......... 398/141; 398/140; 398/139; 398/138; 385/24; 385/59; 385/71

(58) Field of Classification Search
CPC .............. G02B 6/04; G02B 6/10; G02B 6/38; G02B 6/44; G02B 6/4401; G02B 6/4452; G02B 6/4453; H04B 10/00; H04B 10/12; H04B 10/25; H04B 10/2503; H04B 10/2504
USPC ......... 398/164, 165, 166, 141, 140, 142, 139, 398/138, 135, 145; 385/15, 24, 31, 39, 50, 385/51, 59, 70, 71
See application file for complete search history.

(56) References Cited

U.S. PATENT DOCUMENTS

| | | |
|---|---|---|
| 4,611,887 A | 9/1986 | Glover et al. |
| 4,699,460 A | 10/1987 | Szentesi |
| 5,204,925 A | 4/1993 | Bonanni et al. |
| 6,185,358 B1 | 2/2001 | Park |
| 6,219,479 B1 | 4/2001 | Madden et al. |
| 6,224,269 B1 | 5/2001 | Engstrand et al. |
| 6,275,643 B1 | 8/2001 | Bandy et al. |
| 6,351,582 B1 | 2/2002 | Dyke et al. |
| 6,364,539 B1 | 4/2002 | Shahid |

(Continued)

FOREIGN PATENT DOCUMENTS

| | | | |
|---|---|---|---|
| EP | 1065544 A2 | 1/2001 | |
| WO | WO02/44782 A2 | 6/2002 | ............... G02B 6/38 |
| WO | 03016975 A2 | 2/2003 | |

OTHER PUBLICATIONS

Non-final Office Action for U.S. Appl. No. 12/323,356 mailed Sep. 30, 2011, 15 pages.

(Continued)

*Primary Examiner* — M. R. Sedighian

(57) ABSTRACT

An optical interconnection module (100) for connecting to a media converter module (20) as part of a hybrid electrical-optical network (10) is disclosed. The optical interconnection module includes a transmitter connector (136T) having transmit ports ($PO_T(i)$) and a receiver connector having receive ports ($PO_R(i)$). The optical interconnection module also has transmit/receive ports ($PO_F(i)$) that are optically connected via a set (F) of fibers (142) to the transmit and receive ports of the transmitter and receiver connectors using one of two port configurations. Hybrid electrical-optical networks that utilize a trunk cable (60) to connect the media converter module to the optical interconnection module are also disclosed.

24 Claims, 12 Drawing Sheets

(56) References Cited

U.S. PATENT DOCUMENTS

| | | | |
|---|---|---|---|
| 6,402,393 | B1 | 6/2002 | Grimes et al. |
| 6,464,404 | B1 | 10/2002 | Robinson et al. |
| 6,496,641 | B1 | 12/2002 | Mahony |
| 6,501,900 | B1 | 12/2002 | Aloisio, Jr. et al. |
| 6,554,483 | B1 | 4/2003 | Sun et al. |
| 6,621,975 | B2 | 9/2003 | Laporte et al. |
| 6,694,083 | B2 | 2/2004 | Paradiso et al. ............... 385/135 |
| 6,758,600 | B2 | 7/2004 | Del Grosso et al. ............ 385/71 |
| 6,869,227 | B2 | 3/2005 | Del Grosso et al. ............ 385/71 |
| 7,088,981 | B2 | 8/2006 | Chang |
| 7,147,383 | B2 * | 12/2006 | Sullivan ......................... 385/59 |
| 7,237,966 | B2 * | 7/2007 | Quinby et al. .................. 385/78 |
| 7,391,952 | B1 | 6/2008 | Ugolini et al. ................ 385/135 |
| 7,646,981 | B2 * | 1/2010 | Coffey ............................. 398/79 |
| 7,689,079 | B2 * | 3/2010 | Burnham et al. ............... 385/51 |
| 7,756,371 | B1 | 7/2010 | Burnham et al. |
| 8,009,959 | B2 | 8/2011 | Barnes et al. |
| 8,251,591 | B2 | 8/2012 | Barnes et al. |
| 2002/0181925 | A1 | 12/2002 | Hodge et al. |
| 2003/0044141 | A1 | 3/2003 | Melton et al. |
| 2003/0072537 | A1 | 4/2003 | Eichenberger et al. |
| 2003/0210861 | A1 | 11/2003 | Weiss et al. |
| 2004/0062498 | A1 | 4/2004 | Del Grosso et al. |
| 2004/0179771 | A1 | 9/2004 | Verhagen et al. |
| 2004/0184741 | A1 | 9/2004 | Del Grosso et al. |
| 2005/0036749 | A1 | 2/2005 | Vogel et al. |
| 2005/0152640 | A1 | 7/2005 | Lemoff |
| 2005/0207709 | A1 | 9/2005 | Del Grosso et al. |
| 2006/0029334 | A1 | 2/2006 | Quinby et al. |
| 2006/0034573 | A1 | 2/2006 | Guan et al. |
| 2006/0045521 | A1 | 3/2006 | Emery et al. |
| 2006/0133736 | A1 | 6/2006 | Sullivan |
| 2006/0269208 | A1 | 11/2006 | Allen |
| 2006/0280420 | A1 | 12/2006 | Blackwell et al. |
| 2007/0071392 | A1 | 3/2007 | Baucom et al. |
| 2007/0189694 | A1 | 8/2007 | Mullaney et al. |
| 2008/0152292 | A1 | 6/2008 | Wilken |
| 2008/0175548 | A1 | 7/2008 | Knecht et al. |
| 2008/0193091 | A1 | 8/2008 | Herbst |
| 2008/0205824 | A1 | 8/2008 | Cody et al. |
| 2008/0279506 | A1 | 11/2008 | Kerry et al. |
| 2009/0103879 | A1 | 4/2009 | Tang et al. |
| 2009/0154888 | A1 | 6/2009 | Abbott, III et al. |
| 2009/0169163 | A1 | 7/2009 | Abbott, III et al. |
| 2009/0180737 | A1 | 7/2009 | Burnham et al. |
| 2009/0263089 | A1 | 10/2009 | Keller et al. |
| 2009/0290844 | A1 | 11/2009 | Mullaney et al. |
| 2010/0092129 | A1 | 4/2010 | Conner |
| 2010/0092133 | A1 | 4/2010 | Conner |
| 2010/0092146 | A1 | 4/2010 | Conner et al. |
| 2010/0092169 | A1 | 4/2010 | Conner et al. |
| 2010/0092171 | A1 | 4/2010 | Conner |
| 2010/0098386 | A1 | 4/2010 | Kleeberger |
| 2010/0303408 | A1 | 12/2010 | Conner et al. |
| 2010/0322554 | A1 | 12/2010 | Barnes et al. |
| 2011/0129226 | A1 | 6/2011 | Vleugels et al. |
| 2011/0274400 | A1 | 11/2011 | Mudd et al. |
| 2011/0293277 | A1 | 12/2011 | Bradea et al. |
| 2012/0288233 | A1 | 11/2012 | Barnes et al. |
| 2013/0163932 | A1 | 6/2013 | Cooke et al. |
| 2014/0140660 | A1 | 5/2014 | Buff et al. |

OTHER PUBLICATIONS

Final Office Action for U.S. Appl. No. 12/323,356 mailed Mar. 2, 2012, 18 pages.
Non-final Office Action for U.S. Appl. No. 12/323,385 mailed Sep. 21, 2011, 10 pages.
Final Office Action for U.S. Appl. No. 12/323,385 mailed Mar. 6, 2012, 12 pages.
Advisory Action for U.S. Appl. No. 12/323,385 mailed Jun. 15, 2012, 2 pages.
Non-final Office Action for U.S. Appl. No. 10/805,892 mailed Aug. 10, 2004, 4 pages.
Notice of Allowance for U.S. Appl. No. 10/805,892 mailed Dec. 21, 2004, 5 pages.
Non-final Office Action for U.S. Appl. No. 11/020,730 mailed Feb. 28, 2006, 6 pages.
Notice of Allowance for U.S. Appl. No. 11/020,730 mailed Sep. 20, 2006, 7 pages.
Non-final Office Action for U.S. Appl. No. 12/472,849 mailed Oct. 12, 2011, 9 pages.
Non-final Office Action for U.S. Appl. No. 12/472,849 mailed Aug. 20, 2012, 9 pages.
Final Office Action for U.S. Appl. No. 12/472,849 mailed May 13, 2013, 15 pages.
Advisory Action and Examiner-Initiated Interview Summary for U.S. Appl. No. 12/472,849 mailed Aug. 5, 2013, 5 pages.
Non-final Office Action for U.S. Appl. No. 12/472,849 mailed Oct. 9, 2013, 14 pages.
Non-final Office Action for U.S. Appl. No. 12/486,427 mailed Mar. 5, 2010, 5 pages.
Notice of Allowance for U.S. Appl. No. 12/486,427 mailed Aug. 27, 2010, 6 pages.
Notice of Allowance for U.S. Appl. No. 12/486,427 mailed Jun. 13, 2011, 7 pages.
Non-final Office Action for U.S. Appl. No. 12/486,427 mailed Oct. 21, 2010, 5 pages.
Notice of Allowance for U.S. Appl. No. 12/486,473 mailed May 29, 2012, 9 pages.
Non-final Office Action for U.S. Appl. No. 12/486,473 mailed Sep. 29, 2011, 4 pages.
Non-final Office Action for U.S. Appl. No. 12/323,344 mailed Aug. 18, 2011, 8 pages.
Notice of Allowance for U.S. Appl. No. 12/323,344 mailed Jan. 9, 2012, 9 pages.
Non-final Office Action for U.S. Appl. No. 12/323,395 mailed Dec. 8, 2011, 7 pages.
International Search Report for PCT/US2009/056880 mailed Nov. 9, 2009, 3 pages.
International Search Report for PCT/US2009/057128 mailed Nov. 9, 2009, 2 pages.
International Search Report for PCT/US2009/057140 mailed Nov. 9, 2009, 3 pages.
International Search Report for PCT/US2009/057244 mailed Nov. 9, 2009, 4 pages.
International Preliminary Report on Patentability for PCT/US2009/057244 mailed Apr. 19, 2011, 7 pages.
International Search Report for PCT/US2010/035939 mailed Aug. 16, 2010, 2 pages.
Tanji et al., "Optical Fiber Cabling Technologies for Flexible Access Network," Optical Fiber Technology, Academic Press, London, US, vol. 14, No. 3, Jul. 1, 2008, 8 pages.
Author Unknown, "High Density PARA-OPTIX Cable Assemblies and Enclosures," Tyco Electronics, 2007, 2 pages.
Non-final Office Action for U.S. Appl. No. 13/559,070 mailed Sep. 27, 2012, 7 pages.
Final Office Action for U.S. Appl. No. 13/559,070 mailed Oct. 1, 2013, 8 pages.
Kolesar et al., "Clause 86 MDI Optical Pin Layout and Connector," IEEE P802.3ba, Jan. 2009, 24 pages.
Author Unknown, "TIA Standard: Optical Fiber Cabling Components Standard," TIA-568-C.3, Telecommunications Industry Association, Jun. 2008, 38 pages.
Author Unknown, "Parallel Optics," Applications Engineering Note 123, Rev 0, Corning Cable Systems LLC, Mar. 23, 2008, 4 pages.
Author Unknown, "Fiber Systems: Best Practices for Ensuring Polarity of Array-Based Fiber Optic Channels," White Paper, Panduit Corp., 2008, 10 pages.
Stewart, "Optical Assembly Plant: Base 8 Ribbon Module Jumper "Classic"," Flyer 0000009429-EN, Corning Cable Systems, Jan. 23, 2008, 1 page.
Author Unknown, "Data Center Fabric: Corning Cable Systems Optical Cabling Solutions for Brocade," Technical Brief, GA-TB-052-01, Brocade Communications Systems, Inc., Sep. 2008, 26 pages.

(56) References Cited

OTHER PUBLICATIONS

Author Unknown, "U-Space System for Brocade 48000," Product Specifications, LAN-904-EN, Corning Cable Systems LLC, Apr. 2008, 16 pages.
Author Unknown, "U-Space System for Brocade SAN Directors," Specification Sheet, LAN-904-EN, Corning Cable Systems LLC, Oct. 2010, 8 pages.
Author Unknown, "Base 8 Modules," Standard Recommended Procedure 003-121, Issue 1, Corning Cable Systems LLC, Apr. 2008, 3 pages.
Author Unknown, "QSFP (Quad Small Formfactor Pluggable) Transceiver," INF-8438i Specification, SFF Committee, Rev 1.0, Nov. 2006, 75 pages.
Non-final Office Action for U.S. Appl. No. 12/472,849 mailed May 23, 2014, 13 pages.
Non-final Office Action for U.S. Appl. No. 12/323,395 mailed Apr. 17, 2014, 15 pages.
Quayle Action for U.S. Appl. No. 13/557,671 mailed Dec. 6, 2013, 4 pages.
Notice of Allowance for U.S. Appl. No. 13/557,671 mailed Jun. 25, 2014, 6 pages.
Non-final Office Action for U.S. Appl. No. 13/559,070 mailed Apr. 3, 2014, 8 pages.
International Search Report for PCT/US2013/051424 mailed Oct. 21, 2013, 4 pages.
Notice of Allowance for U.S. Appl. No. 12/323,356 mailed Jan. 17, 2014, 7 pages.

\* cited by examiner

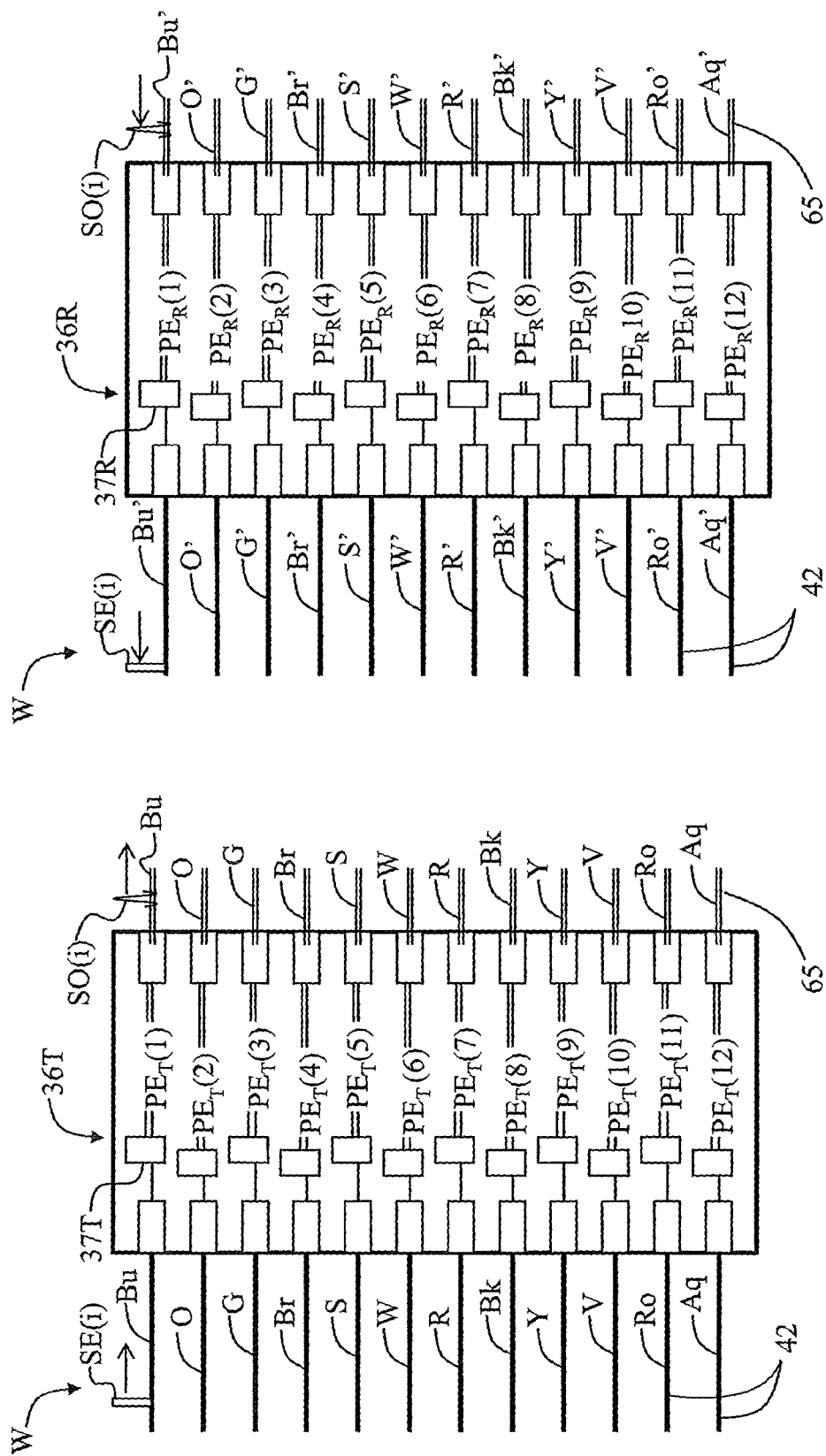

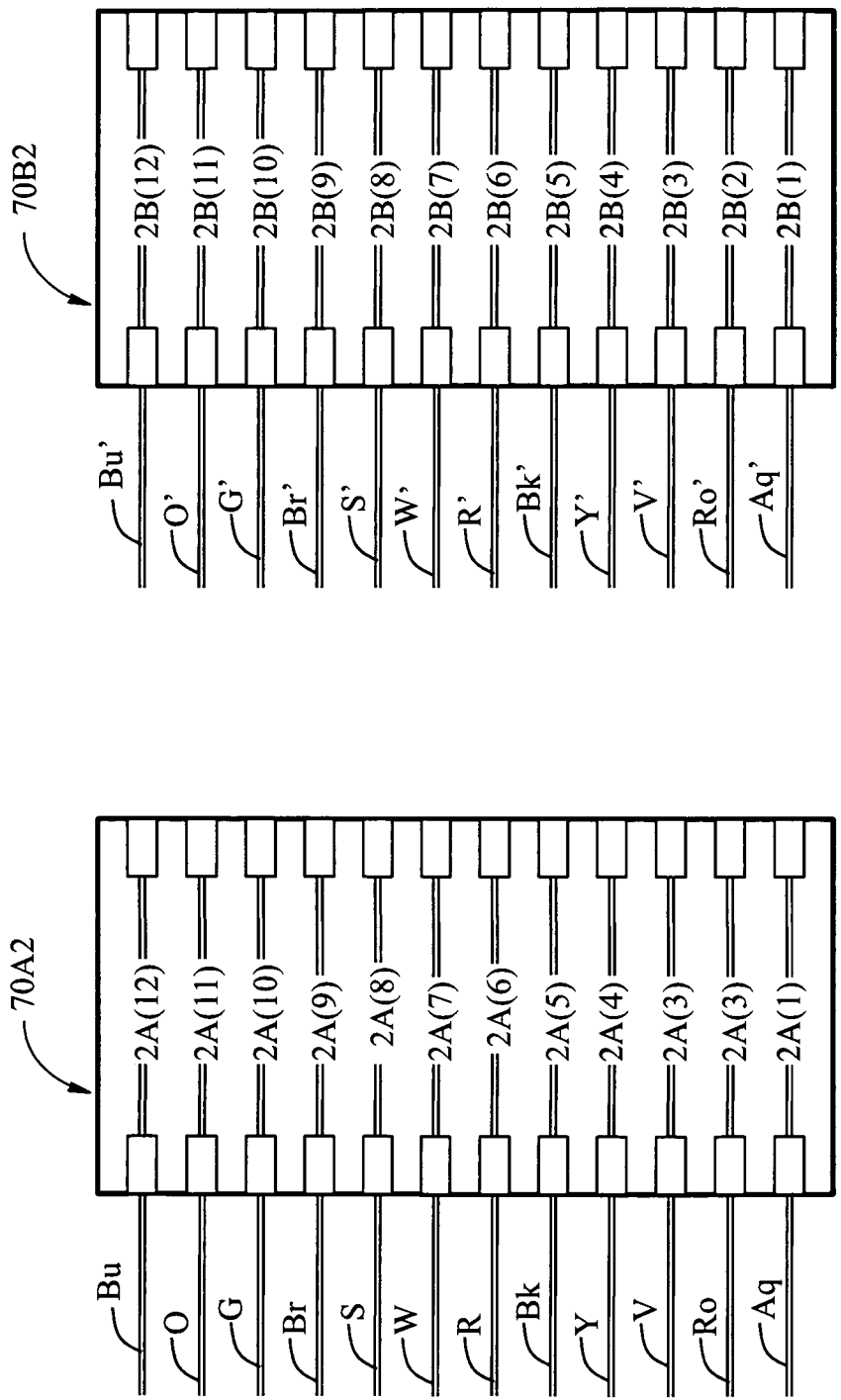

OPTICAL INTERCONNECTION MODULES FOR HYBRID ELECTRICAL-OPTICAL NETWORKS

FIELD OF THE INVENTION

The present invention relates to optical fiber networks, and in particular relates to optical interconnection modules for use in hybrid electrical-optical networks that include media converter modules.

BACKGROUND OF THE INVENTION

Conventional computer networking in a telecommunication data center utilizes system equipment in the form of servers, switches and storage devices interconnected through a cabling infrastructure. Various types of cables, such as unshielded twisted pair (UTP), coaxial, and fiber optic, are used to interconnect the system equipment. These different types of cables can be used within the same type of network. For example, Ethernet networks or local area networks (LANs), can use many different types of cables, ranging from UTP to coaxial to fiber optic cables.

The type of cable utilized in a given telecommunications network is dictated by the network interface card of the system equipment. For example, if the network interface card is configured with small form-factor pluggable (SFP) optical transceivers, then fiber optic cabling is typically utilized. However, if the system equipment's interface card is configured with RJ-45 style modular jacks, then UTP cabling is typically utilized. Careful consideration of the type of cabling deployed and how it is deployed (i.e., the network "topology") is important to maintain an efficient, reliable, and scalable network.

The telecommunications industry is still in the initial ramp-up stage of 10 Gigabit system equipment deployments, with 100 Gigabit deployments predicted to occur in 2011. Optics-enabled Gigabit system equipment is typically three times more expensive than UTP-enabled (i.e., electronics-enabled) Gigabit equipment. Telecommunication companies are thus often faced with the decision of deploying either cost-effective electronics-enabled Gigabit equipment configured with RJ-type modular plugs with the associated UTP cabling infrastructure, or the higher priced optics-based equipment with an optical cabling infrastructure. While deploying the less expensive electronics-based system and cabling infrastructure is appealing, the risk is that once 10 Gigabit and 100 optics-based Gigabit system equipment is deployed, the UTP cabling infrastructure will need to be re-cabled with an optical fiber cabling infrastructure.

An approach that allows for using the lower-cost electronics-based Gigabit system equipment with an optical backbone cabling infrastructure is to employ electrical-to-optical (E/O) and optical-to-electrical (O/E) conversion. Such conversion can be accomplished, for example, using Media Converter Modules (MCMs), such as the Plug & Play™ MCM available from Corning Cable Systems, LLC, of Hickory, N.C. The MCMs provide connectivity between UTP copper cabling and fiber optic cabling.

To migrate this cabling solution to a higher-data-rate optical network, such as a 10 Gigabit or 100 Gigabit Ethernet network, the MCM modules are replaced by optical interconnection modules (e.g., "reconfigurable drop modules" ("RDMs") or "optical break-out modules") that are patched directly into the optical backbone cabling infrastructure. In this case, the optical backbone cabling infrastructure (that includes "trunk" fiber optic cables) stays in place and does not have to be re-cabled.

For some networks, one end of the network either prefers to use or is compelled to use MCMs, while the other end prefers to use or is compelled to use optical interconnection modules. Thus, an alternative network solution involves using MCM modules at one end, optical interconnection modules at the other end, and an optical backbone cabling infrastructure connecting the two ends, thereby forming what is referred to herein as an "electrical-optical (E-O) hybrid" network configuration. In this configuration, copper-ported equipment is used at one end (or one part) of the network, and fiber-ported equipment is used at the other end (or another part) of the network. However, a complication arises in such an E-O hybrid network in that port "polarity" is not conserved, i.e., there is a configuration mismatch wherein the ports of the MCM module are not routed to the corresponding ports of the optical interconnection module.

SUMMARY OF THE INVENTION

A first aspect of the invention is an optical interconnection module for connecting to a media converter module. The optical interconnection module includes a transmitter connector having transmit ports $PO_T(i)$, a receiver connector having receive ports $PO_R(i)$, and transmit/receive ports $PO_F(i)$ that are optically connected to the transmit ports $PO_T(i)$ and the receive ports $PO_R(i)$ according to either:

a) a first port configuration defined by:
$\{PO_F(i)\} \leftrightarrow \{PO_T(i), PO_R(13-)\}$ for i=1 to 12; or b) a second port configuration defined by:
$\{PO_F(i)\} \leftrightarrow \{PO_T(12-i), PO_R(i+1)\}$ for i=1 to 12 odd (i.e., i=1, 3, 5, . . . 11) and
$\{PO_F(i)\} \leftrightarrow \{PO_T(14-i), PO_R(i-1)\}$ for i=1 to 12 even (i.e., i=2, 4, 6, . . . 12)

A second aspect of the invention is a hybrid electrical-optical network that includes a media converter module having transmit/receive ports $PE_F(i)$ that are electrically connected to an electrical-to-optical transmitter unit having transmit ports $PE_T(i)$ and to an optical-to-electrical receiver unit having receive ports $PE_R(i)$ according to a port configuration defined by: $\{PE_F(i)\} \leftrightarrow \{PE_T(i), PE_R(13-i)\}$ for i=1 to 12. The hybrid electrical-optical network also includes an optical interconnection module having transmit/receive ports $PO_F(i)$ that are optically connected to a transmitter connector having transmit ports $PO_T(i)$ and to a receiver connector having receive ports $PO_R(i)$ according to a port configuration defined by: $\{PO_F(i)\} \leftrightarrow \{PO_T(i), PO_R(13-i)\}$ for i=1 to 12. The electrical-optical network further includes a fiber optic cable configured to optically connect the media converter module to the optical interconnection module so as to establish a port configuration defined by:
$\{PE_F(i)\} \leftrightarrow \{PO_F(i)\}$.

A third aspect of the invention is a hybrid electrical-optical network that includes a media converter module having transmit/receive ports $PE_F(i)$ that are electrically connected to an electrical-to-optical transmitter unit having transmit ports $PE_T(i)$ and to an optical-to-electrical receiver unit having receive ports $PE_R(i)$ according to a port configuration defined by: $\{PE_F(i)\} \leftrightarrow \{PE_T(i), PE_R(13-i)\}$ for i=1 to 12. The hybrid electrical-optical network also includes an optical interconnection module having transmit/receive ports $PO_F(i)$ that are optically connected to a transmitter connector having transmit ports $PO_T(i)$ and to a receiver connector having receive ports $PO_R(i)$ according to a port configuration defined by:

$\{PO_F(i)\} \leftrightarrow \{PO_T(12-i), PO_R(i+1)\}$ for i=1 to 12 odd (i.e., i=1, 3, 5, ... 11) and $\{PO_F(i)\} \leftrightarrow \{PO_T(14-i), PO_R(i-1)\}$ for i=1 to 12 even (i.e., i=2, 4, 6, ... 12).

The hybrid electrical-optical network further includes a fiber optic cable configured to optically connect the media converter module to the optical interconnection module so as to establish a port configuration defined by: $\{PE_F(i)\} \leftrightarrow \{PO_F(i)\}$.

BRIEF DESCRIPTION OF THE DRAWINGS

FIG. 4A and FIG. 4B are respective close-up schematic diagrams of the electrical-to-optical (E/O) transmitter unit and the optical-to-electrical (O/E) receiver unit of the MCM, showing the corresponding transmit and receive ports and the corresponding E/O and O/E converter units;

FIG. 8A and FIG. 8B are close-up schematic diagrams of the two fiber optic cable connectors at the OIM end of the trunk cable, showing the respective connector ports for each connector along with the color-coded optical fibers;

Figure 1:
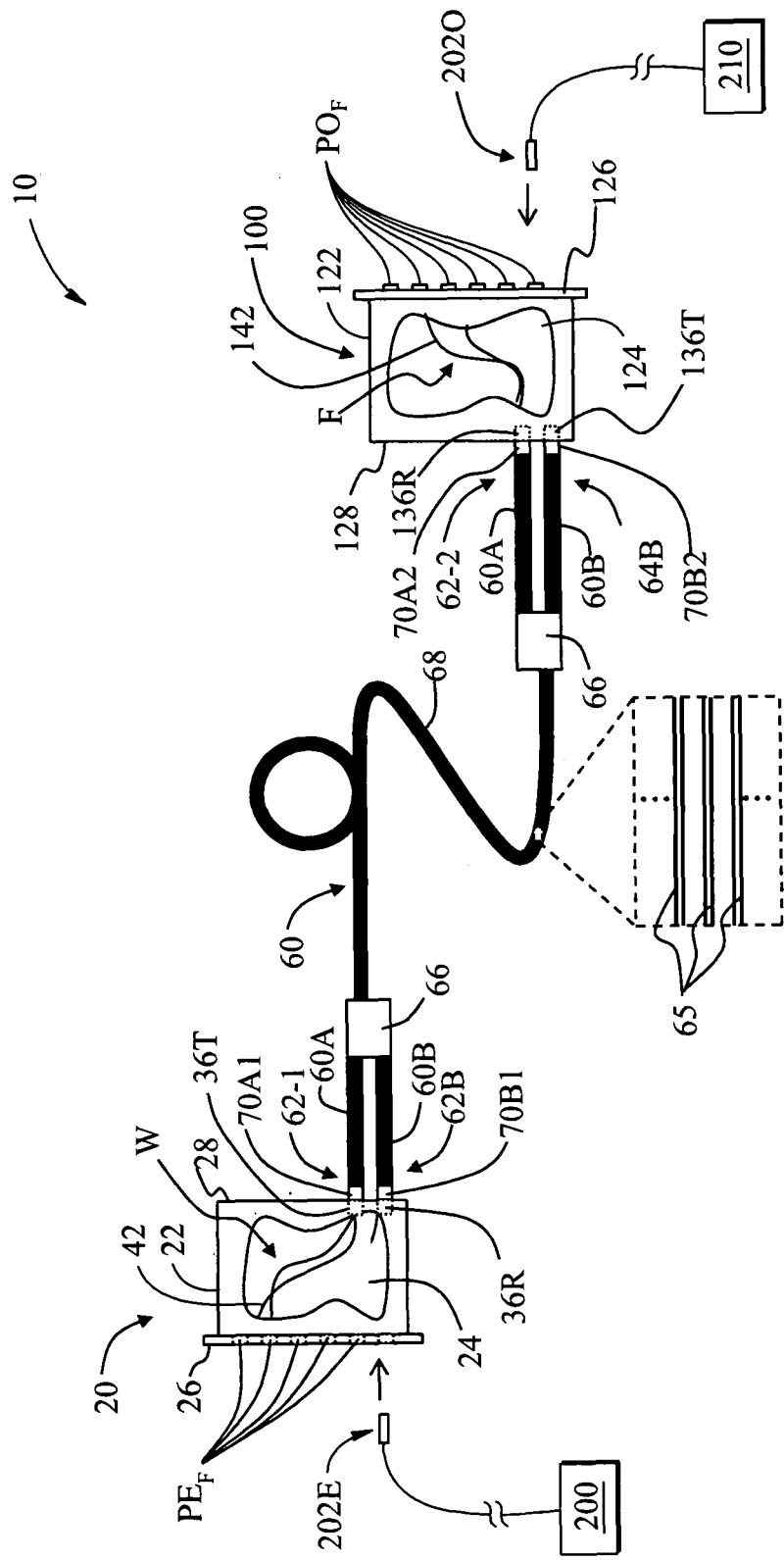
FIG. 1 is a schematic diagram of a generalized example embodiment of an electrical-optical (E-O) network according the present invention that includes a media converter module (MCM) and an optical interconnection module (OIM) connected by an optical fiber cable, with a server electrically connected to the MCM and an edge switch optically connected to the OIM.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention and, together with the description, serve to explain the principals and operations of the invention.

In the drawings, the same or similar elements are given the same or similar reference numbers.

DETAILED DESCRIPTION OF THE INVENTION

Reference is now made in detail to the present preferred embodiments of the invention, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

In the discussion below and in the claims, the notation
$\{a1, b1, c1 \dots\} \leftrightarrow \{a2, b2, c2 \dots\}$
denotes connecting a1 to a2, b1 to b2, c1 to c2, etc. Likewise, the notation
$\{A(i)\} \leftrightarrow \{B(j)\}$
denotes connecting A(i) to B(j), such as A(1) to B(1), A(2) to B(3), A(3) to B(5), etc., for i=1, 2, 3 ... and j=1, 3, 5 ....

FIG. 1 is a schematic diagram of a generalized example embodiment of an example hybrid E-O network 10 according to the present invention. Hybrid E-O network 10 includes three main components: a MCM 20, an OIM 100, and a fiber optic cable ("trunk cable") 60 that optically connects the MCM to the OIM so that the polarity of the MCM ports and the OIM ports is preserved. MCM 20 is shown operably connected to a "server" 200 via a copper patch cord 202E, while OIM 100 is shown operably connected to an edge switch 210 via an optical patch cord 202O.

MCM 20, OIM 100, and fiber optic cable ("trunk cable") 60 of network 10 are now discussed in greater detail.

Media Converter Module

Figure 2:
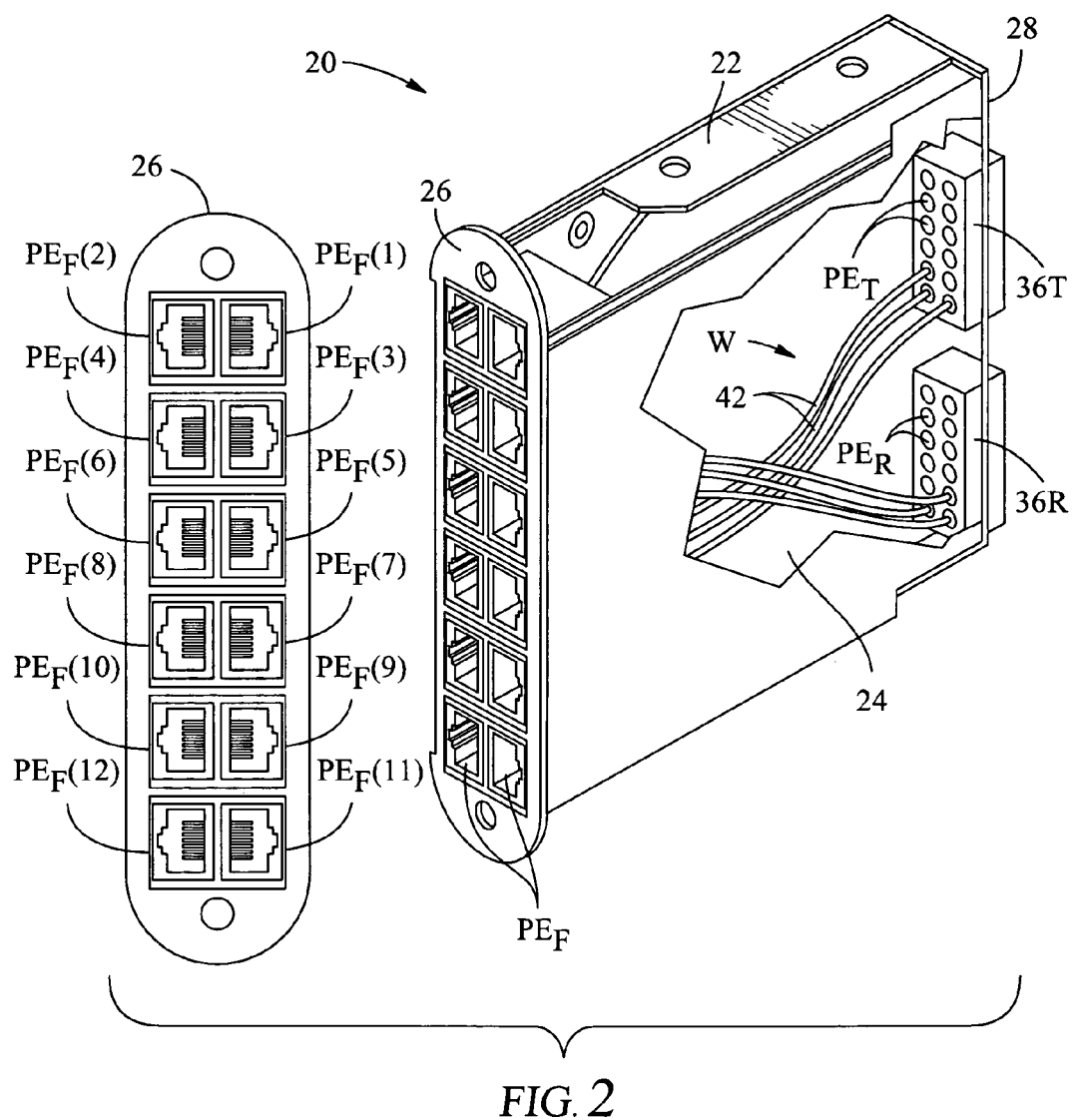
FIG. 2 is perspective view of an example MCM that includes a front-on close-up view of the RJ-type copper ports.
Figure 3:
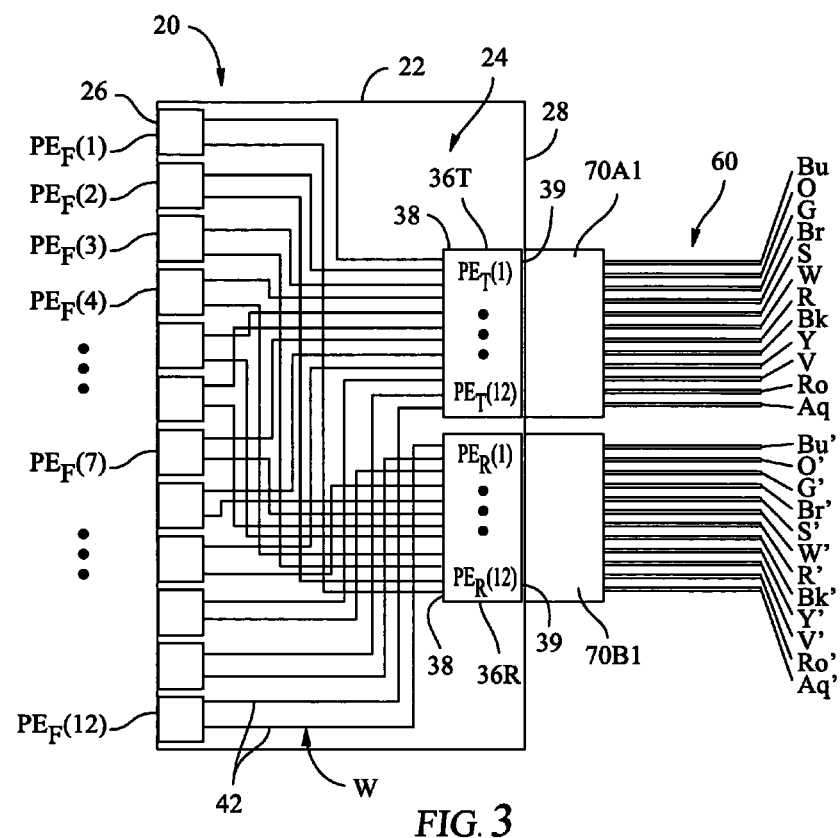
FIG. 3 is a schematic diagram of an example MCM showing an example wiring configuration and port configuration, along with a portion of the trunk cable.

FIG. 2 is perspective view and a close-up front-end view of an example MCM 20, while FIG. 3 is a schematic diagram of an example MCM 20 showing an example wiring and port configuration. With reference to FIG. 1 through FIG. 3, MCM 20 includes a housing 22 that defines an interior 24, a front end 26 and a back end 28. Front end 26 includes n front ports $PE_F$ formed therein. The set of n front ports $PE_F$ is denoted in shorthand notation as $PE_F(i)=\{PE_F(1), PE_F(2) \dots PE_F(n))\}$, wherein i=1 to n, with $PE_F(i)$ indicating the $i^{th}$ port. In an example embodiment, ports $PE_F$ are RJ-type ports. In an example embodiment, n=12.

Interior 24 contains a set W of wires 42, discussed below. In an example embodiment, MCM 20 is sized to fit into a standard electronics housing, e.g., a 1 U or 4 U housing, where "1 U" stands for a standard distance measurement unit of 1.75 inches (44.45 mm) as used in the art of telecommunications.

MCM 20 also includes an electrical-to-optical (E/O) transmitter unit ("transmitter unit") 36T and an optical-to-electrical (O/E) receiver unit ("receiver unit") 36R disposed within housing interior 24 and adjacent back end 28 as shown in FIG. 3. Transmitter and receiver units 36T and 36R each have a front side 38 and a back side 39.

FIG. 4A and FIG. 4B are close-up schematic diagrams of transmitter and receiver units 36T and 36R, respectively, showing transmit and receive ports $PE_T(i)$ and $PE_R(i)$, respectively. In an example embodiment, transmitter and receiver units 36T and 36R have respective sets of 12 single-wire ports $PE_T(i)$ and $PE_R(i)$ (i=1 to 12). In an example embodiment, transmitter and receiver units 36T and 36R are configured at their respective back sides 39 to accommodate respective fiber optic cable connectors, such as MTP-type or MPO-type connectors.

With reference to FIG. 4A, transmitter unit 36T includes an electrical-to-optical (E/O) converter unit 37T that receives electrical signals SE(i) that travel from select ports $PE_F(i)$ via select wires 42 of wire set W to ports $PE_T(i)$ and converts the electrical signals to optical signals SO(i) that then travel over trunk cable 60 to optical interconnection module 100. Likewise, with reference to FIG. 4B, receiver unit 36R includes an optical-to-electrical (O/E) converter unit 37R that receives optical signals SO(i) from select optical fibers 65 in trunk cable 60 and converts the optical signals to electrical signals SE(i) that travel to select ports $PE_F(i)$ via select wires 42 of wire set W.

Front ports $PE_F$ are connected to transmit and receive ports $PE_T$ and $PE_R$ in a select manner via set W of wires 42. For n=12, there are a total of 2n=24 wires 42, with respective wire ends connected to respective transmit and receive ports $PE_T$ and $PE_R$ and two wire ends connected to each front port $PE_F$. Thus, each front port $PE_F$ is a "two-wire" port wired for transmitting and receiving and is therefore also referred to as a "transmit/receive" port.

In an example embodiment, wire set W is configured according to a color-coding scheme, e.g., the standard color-coding scheme used in telecommunications systems for both electronic wires and optical fibers, wherein Bu=blue, O=orange, G=Green, Br=Brown, S=Slate, W=White, R=Red, Bk=Black, Y=Yellow, V=Violet, Ro=Rose, and Aq=Aqua. The color codes associated with transmitter unit 36T are unprimed, while those associated with receiver unit 36R are primed to distinguish between the two sets of twelve color-codes. This color scheme is described in set notation as {Bu, O, G, Br, S, W, R, Bk, Y, V, Ro, Aq} and {Bu', O', G', Br', S', W', R', Bk', Y', V', Ro', Aq'}, with the first set being associated with transmit ports $PE_T(1)$ through $PE_T(12)$, and the second set being associated with receive ports $PE_R(1)$ through $PE_R(12)$.

An example wiring configuration for wires 42 that connect front ports $PE_F$ to transmit and receive ports $PE_T$ and $PE_R$ is set forth in Table 1, below:

TABLE 1

MCM PORT CONNECTIONS

| $PE_F$ | $PE_T, PE_R$ | WIRE COLORS |
|---|---|---|
| $PE_F(1)$ | $PE_T(1), PE_R(12)$ | Bu, Aq' |
| $PE_F(2)$ | $PE_T(2), PE_R(11)$ | O, Ro' |
| $PE_F(3)$ | $PE_T(3), PE_R(10)$ | G, V' |
| $PE_F(4)$ | $PE_T(4), PE_R(9)$ | Br, Y' |
| $PE_F(5)$ | $PE_T(5), PE_R(8)$ | S, Bk' |
| $PE_F(6)$ | $PE_T(6), PE_R(7)$ | W, R' |
| $PE_F(7)$ | $PE_T(7), PE_R(6)$ | R, W' |
| $PE_F(8)$ | $PE_T(8), PE_R(5)$ | Bk, S' |
| $PE_F(9)$ | $PE_T(9), PE_R(4)$ | Y, Br' |
| $PE_F(10)$ | $PE_T(10), PE_R(3)$ | V, G' |
| $PE_F(11)$ | $PE_T(11), PE_R(2)$ | Ro, O' |
| $PE_F(12)$ | $PE_T(12), PE_R(1)$ | Aq, Bu' |

The port configuration in Table 1 is more compactly expressed as:

{$PE_F(i)$} ↔ {$PE_T(i), PE_R(13-i)$} for i=1 to 12).

Optical Interconnection Module

OIM 100 is sometimes referred to in the art as a "reconfigurable drop module" or "RDM." With reference again to FIG. 1, OIM 100 includes a housing 122 having an interior 124, a front end 126 and a back end 128. Front end 126 includes n two-fiber front ports $PO_F$ formed therein. The set of n front ports $PO_F$ is denoted in shorthand notation as $PO_F(i)$={$PO_F(1), PO_F(2) \ldots PO_F(n)$}, wherein i=1 to n, with $PO_F(i)$ indicating the $i^{th}$ port. In an example embodiment, n=12.

Figure 5B:
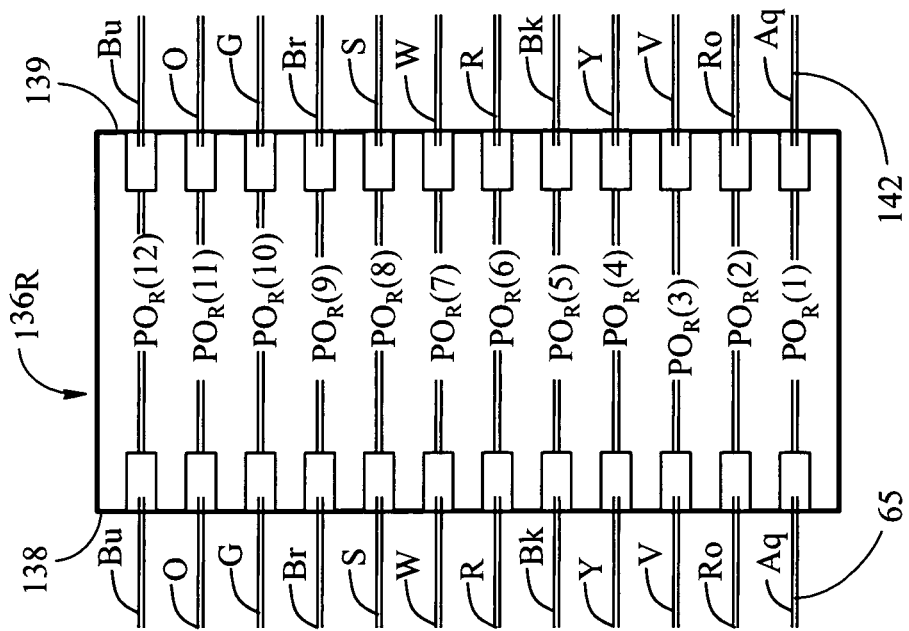
FIG. 5A and FIG. 5B are close-up schematic diagrams of the OIM transmit and receive connectors, respectively, showing the transmit and receive ports.
Figure 5A:
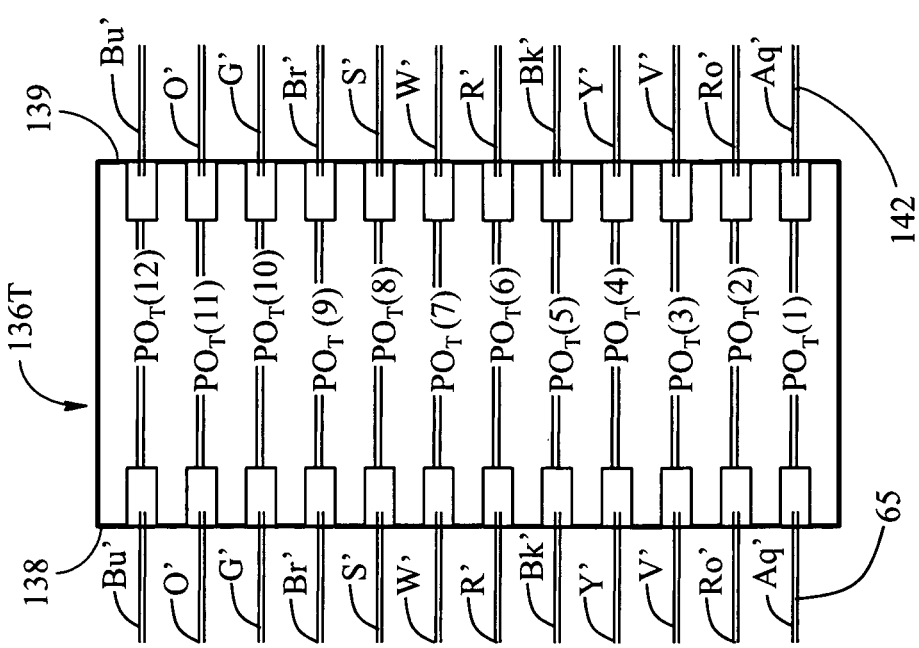

Optical interconnection module 100 includes transmitter and receiver connectors 136T and 136R disposed within housing interior 124 and adjacent back end 128. FIG. 5A and FIG. 5B are close-up schematic diagrams of transmitter and receiver connectors 136T and 136R, respectively. Transmitter and receiver connectors 136T and 136R each have a front side 138 and a back side 139, with respective sets of n transmit and receive ports $PO_T(i)$ and $PO_R(i)$. In an example embodiment, transmitter and receiver connectors 136T and 136R are configured at back side 139 (which is located at housing back end 128) to accommodate respective multifiber connectors 70 from sections 60A and 60B of fiber optic cable 60, as shown in FIG. 1 and as discussed in greater detail below.

OIM 100 also includes a set F of optical fibers 142 that optically connect transmitter and receiver connectors 136T and 136R to front ports $PO_F(i)$ in a select manner. The "wiring" configuration for fiber set F is shown as {Bu', O', G', Br', S', W', R', Bk', Y', V', Ro', Aq'} and {Bu, O, G, Br, S, W, R, Bk, Y, V, Ro, Aq}, with the first set being associated with transmit ports $PO_T(1)$ through $PO_T(12)$, and the second set being associated with receive ports $PO_R(1)$ through $PO_R(12)$.

Unlike the "active" transmitter and receiver units 36T and 36R of MCM 20, transmitter and receiver connectors 136T and 136R of OIM 100 do not convert electrical signals to optical signals and vice versa. Rather, transmitter and receiver connectors 136T and 136R are "passive" or "pass-through" devices that serve to organize fibers 142 in fiber set F for optical coupling to select fibers in trunk cable 60. Thus, optical signals SO(i) are not substantially altered when passing through transmitter and receiver connectors 136T and 136R, except for perhaps the normal attenuation that can occur when making fiber-to-fiber optical connections.

Figure 6:
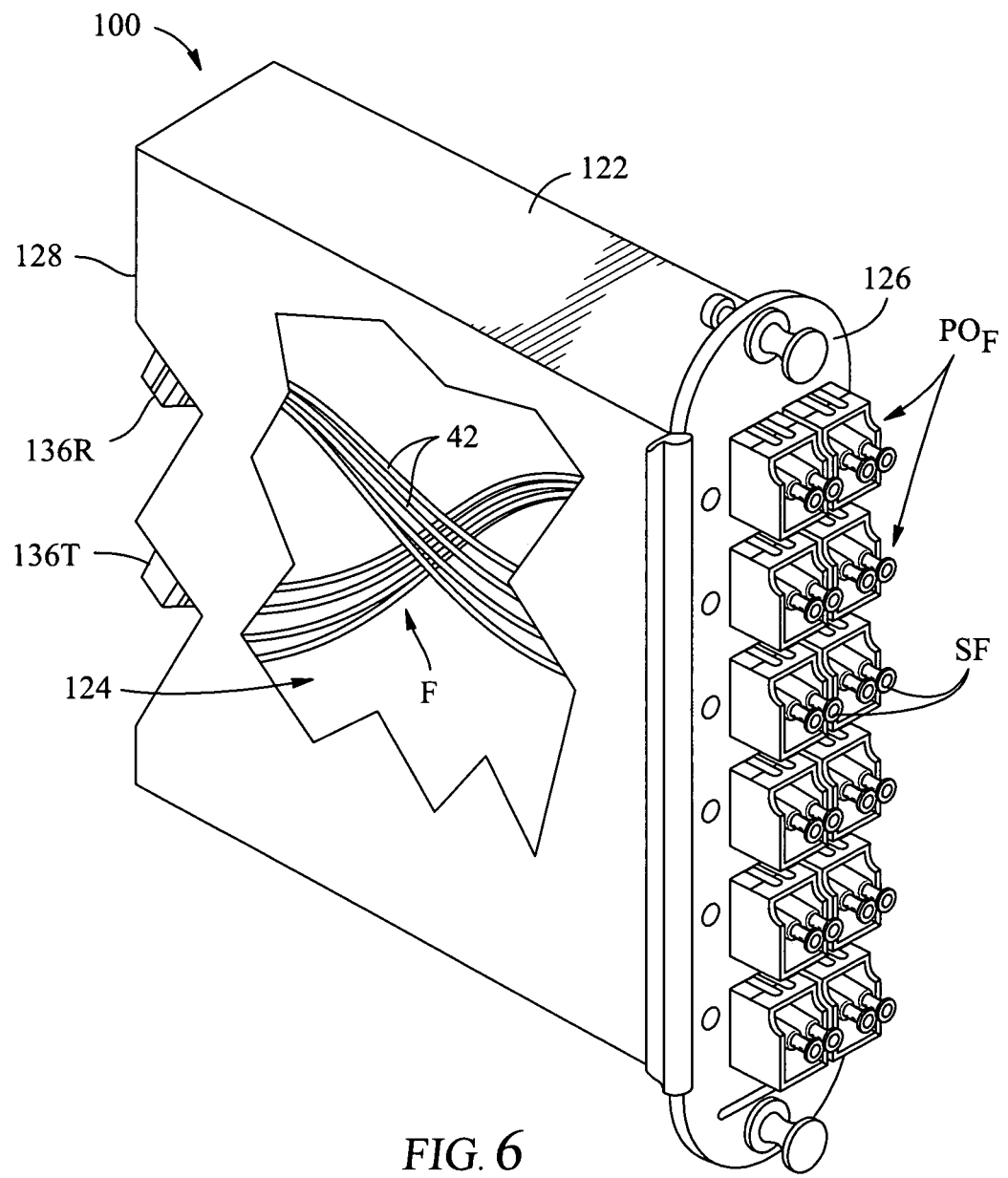
FIG. 6 is a perspective view of an example LC-type OIM that includes twelve two-fiber ports.

FIG. 6 is a perspective view of an example LC-type OIM 100 having 12 dual LC ports $PO_F$, each having two single-fiber ports SF for a total of 24 single-fiber ports.

The present invention includes two main example embodiments of OIM 100 that different port configurations. The two port configurations are referred to below as the "first port configuration" and the "second port configuration." These two port configurations are described in greater detail below in connection with example embodiments of hybrid E-O network 10.

Trunk Cable

With reference again to FIG. 1, in an example embodiment, trunk cable 60 includes respective ends 62-1 and 62-2 and includes two cable sections 60A and 60B. Cable sections 60A and 60B respectively comprise sets SA and SB of twelve optical fibers 65 arranged in a particular color-code scheme. Each cable section 60A and 60B is terminated at cable ends 62-1 and 62-2 with multifiber connectors 70, individually denoted as 70A1 and 70A2 for cable section 60A, and 70B1 and 70B2 for cable section 60B. Connectors 70A1 and 70A2 constitute a first "connector pair" at opposite ends of cable 60, while connectors 70B1 and 70B2 constitute a second "connector pair" also at opposite ends of cable 60. Thus, connectors 70A1 and 70B1 are at cable end 60-1 (the MCM end) while connectors 70A2 and 70B2 are at cable end 60-2 (the OIM end). Cable 60 is shown as having couplers 66 that combine cable sections 60A and 60B into a single middle cable section 68.

In an example embodiment, connectors 70 are preferably epoxy and polish compatible multifiber connectors, for example, part of the LANScape® connector solution set from Corning Cable Systems, LLC. Example connectors 70 are MTP-type or MPO-type connectors. The epoxy and polish connector is a 12-fiber connector achieving very high density in a small space and contains multiple optical paths arranged in a generally planar array. An MTP-type connector is designed for multi-mode or single-mode applications, and uses a push/pull design for easy mating and removal. An MTP-type connector can be the same size as a conventional SC connector, but provides twelve times the fiber density, advantageously saving cost and space. Example MTP-type connectors include a key for proper orientation for registration with any required optical adapters.

Figures 7A, 7B:
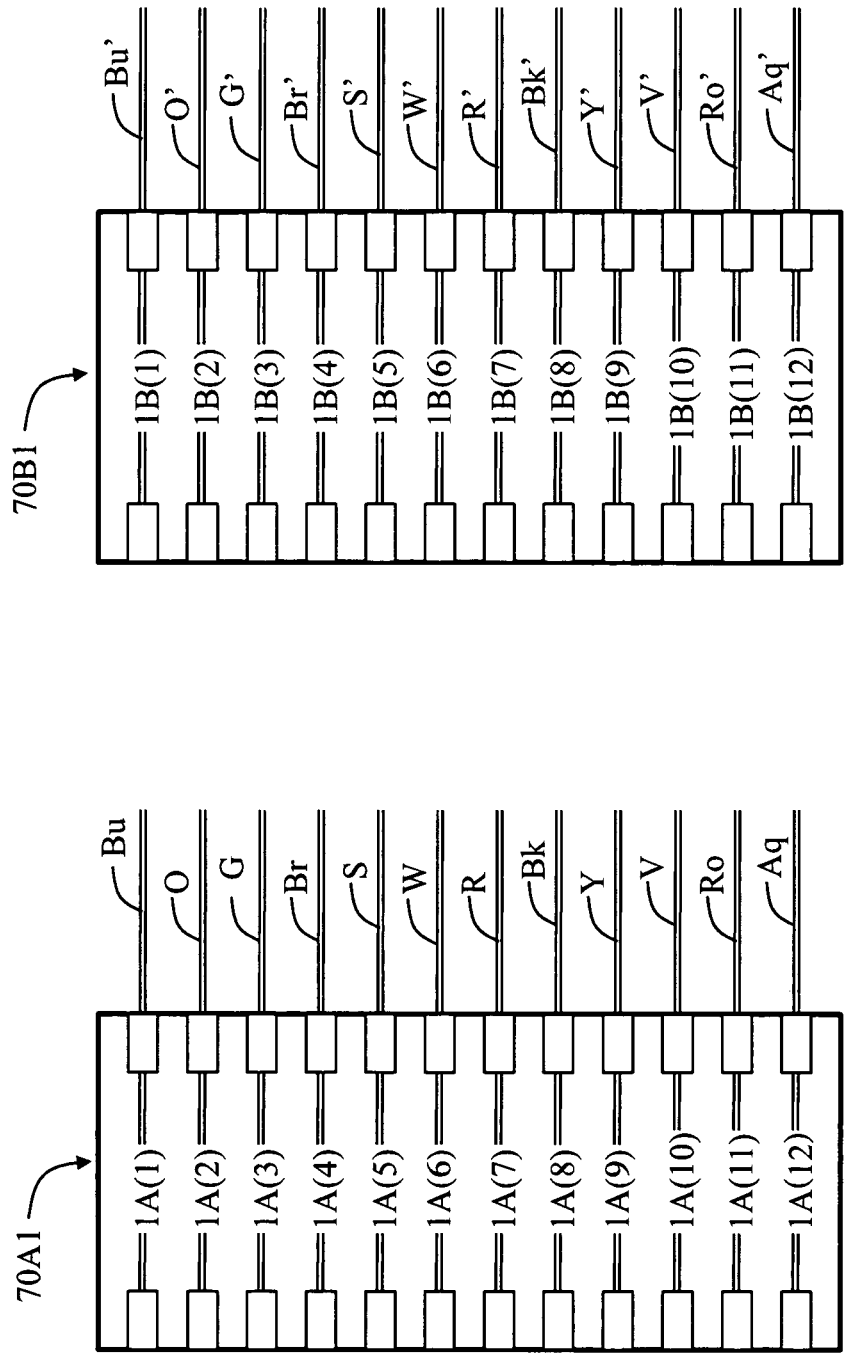
FIG. 7A and FIG. 7B are close-up schematic diagrams of the fiber optic cable connectors at the MCM end of the trunk cable, showing the respective connector ports for each connector along with color-coded optical fibers.

FIG. 7A and FIG. 7B are close-up schematic diagrams of connectors 70A1 and 70B1, respectively, at cable end 62-1 (MCM 20 end), while FIG. 8A and FIG. 8B are close-up schematic diagrams of connectors 70A2 and 70B2, respectively, at cable end 62-2 (OIM 100 end). Connectors 70 of trunk 60 each have 12 ports A and B. Connector 70A1 includes ports 1A(i), connector 70B1 includes ports 1B(i), connector 70A2 includes ports 2A(i), and connector 70B2 includes ports 2B(i). Various configurations for connecting these parts are considered in the example embodiments below.

First Example Hybrid E-O Network

Figure 9:
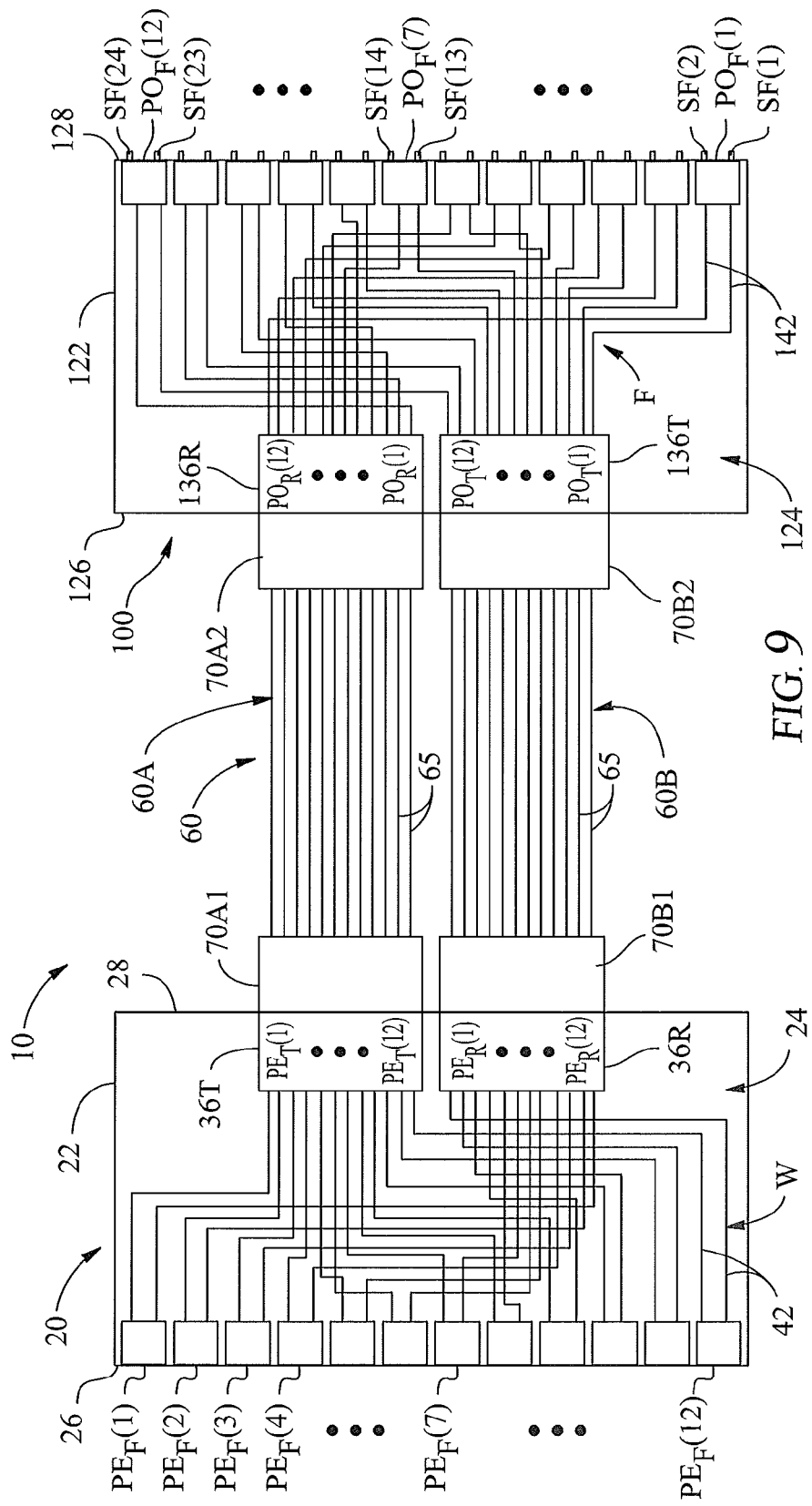
FIG. 9 is a schematic diagram of a first example embodiment of the hybrid E-O network of FIG. 1 that utilizes a universal trunk cable connecting the MCM to the OIM of the present invention in its first port configuration.

FIG. 9 is a schematic diagram of a first example embodiment of hybrid-E-O network 10 of the present invention, wherein trunk cable 60 is in the form of a "universal trunk" cable, and OIM 100 in a first port configuration. In an example embodiment, OIM 100 is an LC-type optical interconnection module such as shown in FIG. 6. Cable sections 60A and 60B of universal trunk 60 respectively comprise sets SA and SB of twelve optical fibers 65 arranged in the color-code scheme SA={Bu, O, G, Br, S, W, R, Bk, Y, V, Ro, Aq} and SB={Bu', O', G', Br', S', W', R', Bk', Y', V', Ro', Aq'}. Universal trunk 60 has a port configuration for connector ports 1A, 2A, 1B and 2B for connectors 70 as defined by (for i=1 to n, wherein n=12):

$\{1A(i)\} \leftrightarrow \{2A(13-i)\}$ and $\{1B(i)\} \leftrightarrow \{2B(13-i)\}$ In the example embodiment of FIG. 9, front ports $PO_F(i)$ of OIM 100 are optical LC duplex ports each having two single-fiber ports SF(i) and each configured to receive an optical patch cord 202O (see FIG. 1). In an example embodiment, n=12, or the same number as front ports $PE_F(i)$ of MCM 20, which corresponds to 2n=24 single-fiber ports SF, i.e., SF(i) for i=1 to 2n.

As discussed above, front ports $PO_F(i)$ of OIM 100 are optically connected to transmit and receive ports $PO_T(i)$ and $PO_R(i)$ in a select manner via set F of fibers 142 contained within housing interior 124. For n=12, there are a total of 2n=24 fibers 142, with respective single fiber ends connected to either a single transmit port $PO_T(i)$ or a single receive port $PO_R(i)$, and two fiber ends connected to respective front ports $PO_F(i)$. In an example embodiment, fiber set F is configured according to the aforementioned color-coding scheme. The color codes associated with transmitter connector 136T are unprimed, while those associated with receiver connector 136R are primed to distinguish between the two sets of twelve color-codes.

An example fiber configuration for fibers 142 that connects front ports $PO_F(i)$ and corresponding single-fiber ports SF(i) to the transmit and receive ports $PO_T(i)$ and $PO_R(i)$ is set forth in Table 2 below:

TABLE 2

OIM PORT CONNECTIONS

| SF | $PO_F$ | $PO_T$, $PO_R$ | WIRE COLORS |
|---|---|---|---|
| SF(1), SF(2) | $PO_F(1)$ | $PO_T(1)$, $PO_R(12)$ | Bu, Aq' |
| SF(3), SF(4) | $PO_F(2)$ | $PO_T(2)$, $PO_R(11)$ | O, Ro' |
| SF(5), SF(6) | $PO_F(3)$ | $PO_T(3)$, $PO_R(10)$ | G, V' |
| SF(7), SF(8) | $PO_F(4)$ | $PO_T(4)$, $PO_R(9)$ | Br, Y' |
| SF(9), SF(10) | $PO_F(5)$ | $PO_T(5)$, $PO_R(8)$ | S, Bk' |
| SF(11), SF(12) | $PO_F(6)$ | $PO_T(6)$, $PO_R(7)$ | W, R' |
| SF(13), SF(14) | $PO_F(7)$ | $PO_T(7)$, $PO_R(6)$ | R, W' |
| SF(15), SF(16) | $PO_F(8)$ | $PO_T(8)$, $PO_R(5)$ | Bk, S' |
| SF(17), SF(18) | $PO_F(9)$ | $PO_T(9)$, $PO_R(4)$ | Y, Br' |
| SF(19), SF(20) | $PO_F(10)$ | $PO_T(10)$, $PO_R(3)$ | V, G' |
| SF(21), SF(22) | $PO_F(11)$ | $PO_T(11)$, $PO_R(2)$ | Ro, O' |
| SF(23), SF(24) | $PO_F(12)$ | $PO_T(12)$, $PO_R(1)$ | Aq, Bu' |

The port configuration set forth in Table 2 above for n=12 is referred to herein as the "first port configuration" for OIM 100 and is expressed in more compact notation as:

$\{SF(2i-1), SF(2i)\} \leftrightarrow \{PO_F(i)\} \leftrightarrow \{PO_T(i), PO_R(13-i)\}$ for i=1 to 12.

One of the goals of hybrid E-O network 10 is to interconnect or "map" the dual-wire transmit/receive electrical front ports $PE_F(i)$ of MCM 20 to the dual-fiber transmit/receive optical front ports $PO_F(i)$ of OIM 100. This involves establishing the following end-to-end configuration:

$\{PE_F(i)\} \leftrightarrow \{PO_F(i)\}$ for i=1 to 12, which in long-hand notation is written as:

$\{PE_F(1), PE_F(2), \ldots PE_F(12)\} \leftrightarrow \{PO_F(1), PO_F(2), \ldots PO_F(12)\}$.

In the present example embodiment that utilizes a universal trunk 60, this requires that the 2n transmit and receive ports $PE_T(i)$ and $PE_R(i)$ of MCM 20 be configured or "mapped" to the 2n single-fiber optical ports SF(j) (for j=1 to 2n) via the following relationships:

$\{PE_T(1), PE_T(2), PE_T(3), PE_T(4), PE_T(5), PE_T(6)\} \leftrightarrow \{SF(1), SF(3), SF(5), SF(7), SF(9), SF(11)\}$ $\{PE_T(7), PE_T(8), PE_T(9), PE_T(10), PE_T(11), PE_T(12)\} \leftrightarrow \{SF(13), SF(15), SF(17), SF(19), SF(21), SF(23)\}$ $\{PE_R(1), PE_R(2), PE_R(3), PE_R(4), PE_R(5), PE_R(6)\} \leftrightarrow \{SF(24), SF(22), SF(20), SF(18), SF(16), SF(14)\}$ $\{PE_R(7), PE_R(8), PE_R(9), PE_R(10), PE_R(11), PE_R(12)\} \leftrightarrow \{SF(12), SF(10), SF(8), SF(6), SF(4), SF(2)\}$ This configuration is written in more compact form as:

$\{PE_T(i)\} \leftrightarrow \{SF(2i)\}$ for i=1 to 12; and $\{PE_R(i)\} \leftrightarrow \{SF(25-2i)\}$ for i=1 to 12.

Second Example Hybrid E-O Network

Figure 10:
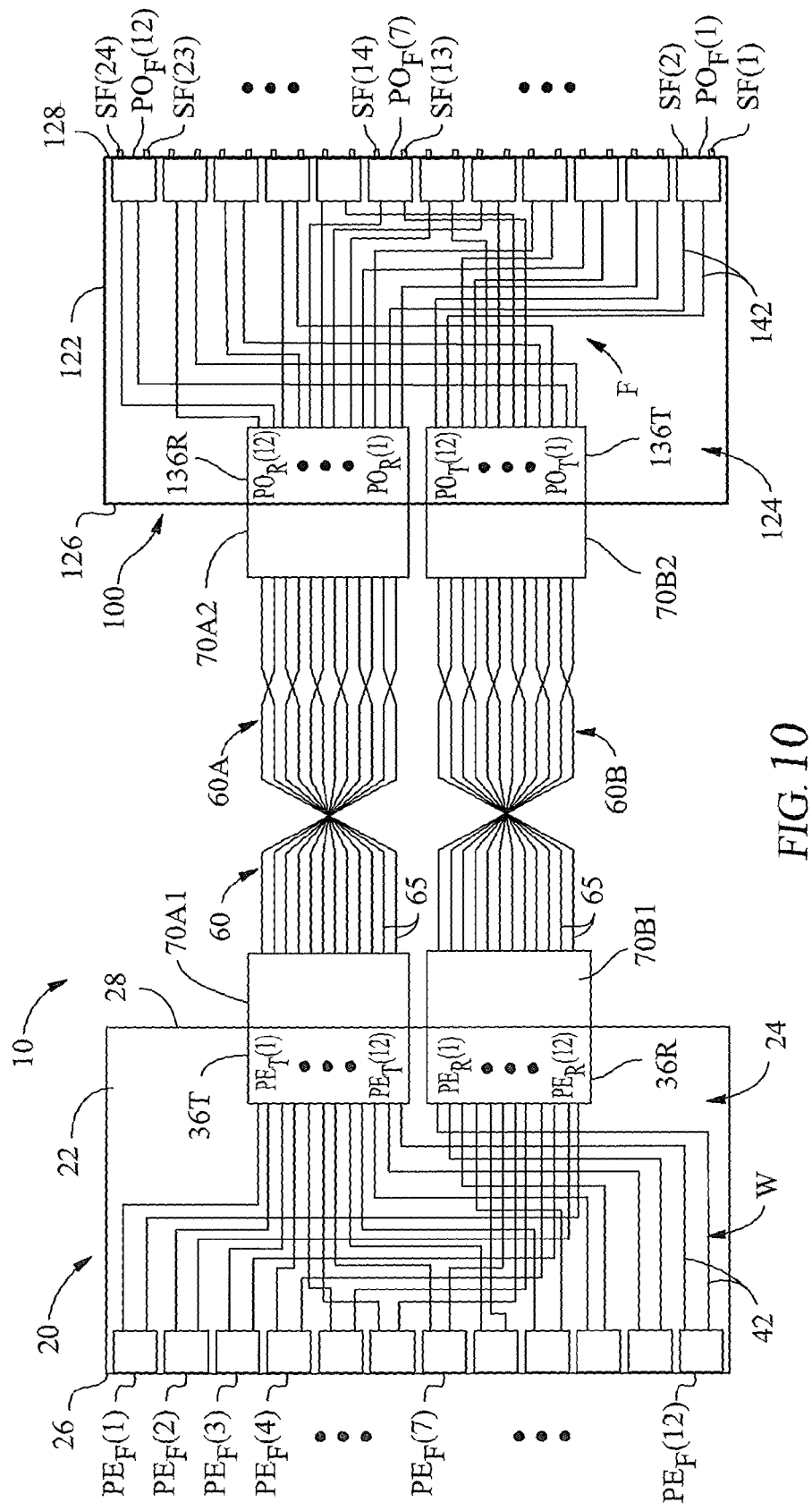
FIG. 10 is a schematic diagram of a second example embodiment of the hybrid E-O network of the present invention similar to that of FIG. 9, but that utilizes a "classic trunk" cable to connect the MCM to the OIM of the present invention in its second port configuration.

FIG. 10 is a schematic diagram of a second example embodiment of hybrid E-O network 10 of the present invention similar to that of FIG. 9, but that utilizes a "classic trunk" cable 60 and a second port configuration for OIM 100. In particular, transmit and receive ports $PO_T(i)$, $PO_R(i)$ and front transmit/receive ports $PO_F(i)$ are configured or mapped in this second port configuration as defined by:

$\{PO_F(i)\} \leftrightarrow \{PO_T(12-i), PO_R(i+1)\}$ for i=1 to 12 odd (i.e., i=1, 3, 5, \ldots 11)

$\{PO_F(i)\} \leftrightarrow \{PO_T(14-i), PO_R(i-1)\}$ for i=1 to 12 even (i.e., i=2, 4, 6, \ldots 12).

This second port configuration is written in more compact form as:

$\{PO_F(i)\} \leftrightarrow \{PO_T(12-i), PO_R(i+1)\}$ for i=1 to 12 odd
$\{PO_F(i)\} \leftrightarrow \{PO_T(14-i), PO_R(i-1)\}$ for i=1 to 12 even.

The configuration of single-fiber ports SF(i) to transmit/receive ports $PO_F(i)$ is as in the first port configuration embodiment, so that:

$\{SF(2i-1), SF(2i)\} \leftrightarrow \{PO_F(i)\}$ for i=1 to 12.

Classic trunk cable 60 has its own mapping of optical fibers 65 between connectors 70 for the cable sections 60A and 60B according to a configuration defined by:

$\{1A(i)\} \leftrightarrow \{2A(12-i)\}$ for i=1 to 12 odd (i.e., i=1, 3, 5, ... 11)
$\{1A(i)\} \leftrightarrow \{2A(14-i)\}$ for i=1 to 12 even (i.e., i=2, 4, 6, ... 12)
$\{1B(i)\} \leftrightarrow \{2B(12-i)\}$ for i=1 to 12 odd (i.e., i=1, 3, 5, ... 11)
$\{1B(i)\} \leftrightarrow \{2B(14-i)\}$ for i=1 to 12 even (i.e., i=2, 4, 6, ... 12)

As in the example embodiment described above in connection with the first port configuration, one of the main goals of hybrid E-O network 10 is to configure or "map" the dual-wire transmit/receive electrical front ports $PE_F(i)$ of MCM 20 to the dual-fiber transmit/receive optical front ports $PO_F(i)$ of OIM 100. In the present example embodiment, this involves establishing the configuration as defined by:

$\{PE_T(1), PE_T(2), PE_T(3), PE_T(4), PE_T(5), PE_T(6)\} \leftrightarrow \{SF(21), SF(23), SF(17), SF(19), SF(13), SF(15)\}$
$\{PE_T(7), PE_T(8), PE_T(9), PE_T(10), PE_T(11), PE_T(12)\} \leftrightarrow \{SF(9), SF(11), SF(5), SF(7), SF(1), SF(3)\}$
$\{PE_R(1), PE_R(2), PE_R(3), PE_R(4), PE_R(5), PE_R(6)\} \leftrightarrow \{SF(4), SF(2), SF(8), SF(6), SF(12), SF(10)\}$
$\{PE_R(7), PE_R(8), PE_R(9), PE_R(10), PE_R(11), PE_R(12)\} \leftrightarrow \{SF(16), SF(14), SF(20), SF(18), SF(24), SF(22)\}$.

This configuration is written in more compact form as:
$\{PE_T(i)\} \leftrightarrow \{SF(2i)\}$ for i=1 to 12
$\{PE_R(i)\} \leftrightarrow \{SF(25-2i)$ for i=1 to 12

The above configuration takes into account the configuration of wire set W in MCM 20, as well as the configuration of fibers 65 in classic trunk 60. In an example embodiment, OIM 100 is an LC-type optical interconnection module such as shown in FIG. 6.

Polarity-Correcting Trunk Cables

Example embodiments of the invention include configuring trunk cable 60 to establish the desired port connection $\{PE_F(i)\} \leftrightarrow \{PO_F(i)\}$ between MCM 20 and OIM 100.

Plug and Play Trunk Configuration

Figure 11:
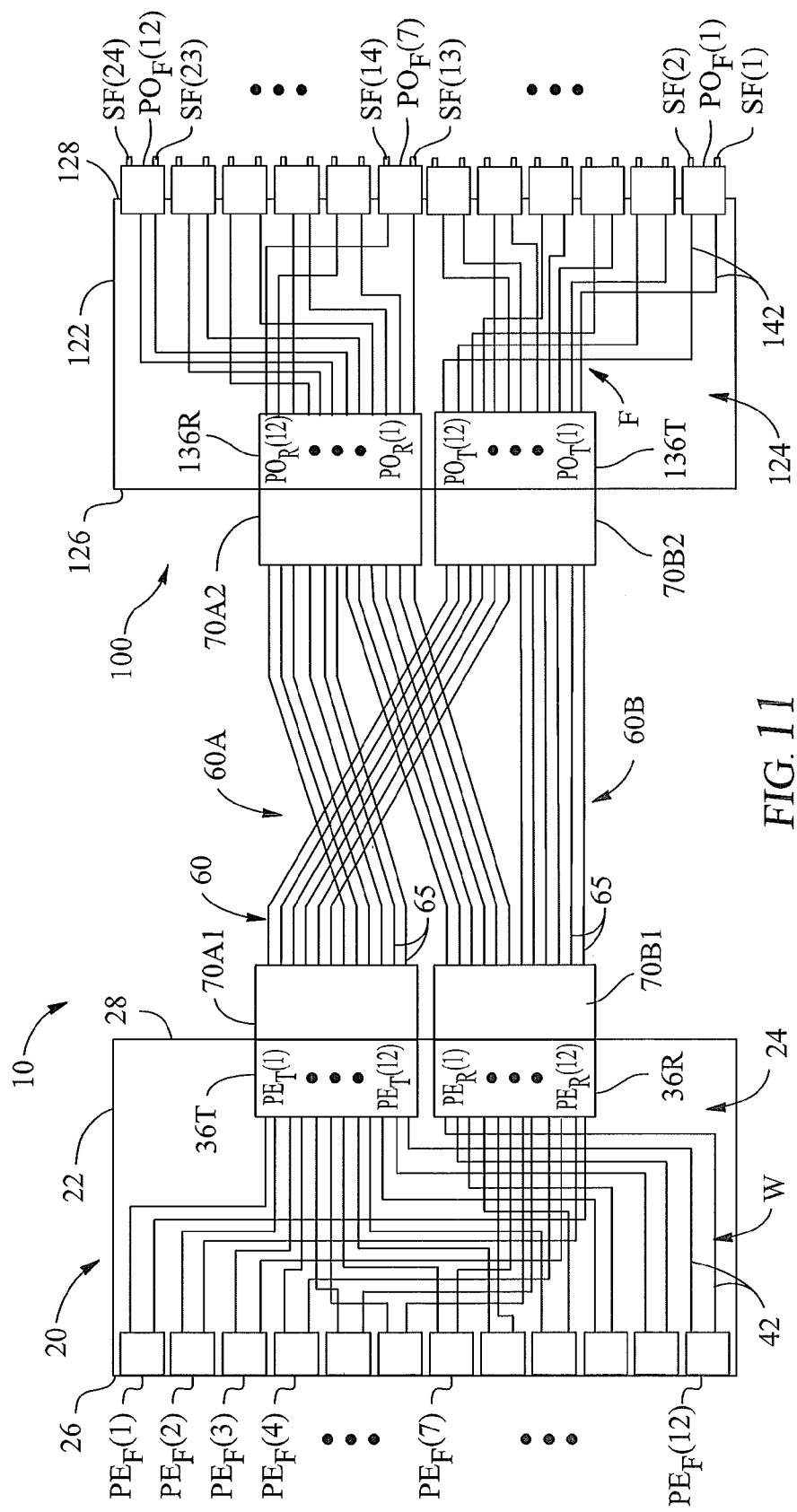
FIG. 11 is a schematic diagram of a third example embodiment of the hybrid E-O network of the present invention, wherein the trunk cable is configured to have the correct polarity for connecting the MCM to a standard universal "plug and play" OIM.

FIG. 11 is a schematic diagram of a third example embodiment of hybrid E-O network 10 of the present invention, wherein trunk 60 is configured to have the correct polarity for connecting MCM 20 to a standard universal "plug and play" OIM 100. Trunk 60 of FIG. 7 is thus referred to as a "plug and play trunk" or "PnP trunk."

Fiber set F of OIM 100 of FIG. 11 is configured as set forth in Table 3 below:

TABLE 3

| OIM PORT CONNECTIONS FOR PnP TRUNK | | |
|---|---|---|
| $PE_F$ | $PE_T, PE_R$ | WIRE COLORS |
| $PO_F(1)$ | $PO_T(1), PO_T(12)$ | Bu', Aq' |
| $PO_F(2)$ | $PO_T(2), PO_T(11)$ | O', Ro' |
| $PO_F(3)$ | $PO_T(3), PO_T(10)$ | G', V' |
| $PO_F(4)$ | $PO_T(4), PO_T(9)$ | Br', Y' |
| $PO_F(5)$ | $PO_T(5), PO_T(8)$ | S', Bk' |
| $PO_F(6)$ | $PO_T(6), PO_T(7)$ | W', R' |

TABLE 3-continued

| OIM PORT CONNECTIONS FOR PnP TRUNK | | |
|---|---|---|
| $PE_F$ | $PE_T, PE_R$ | WIRE COLORS |
| $PO_F(7)$ | $PO_T(1), PO_T(12)$ | Bu, Aq |
| $PO_F(8)$ | $PO_T(2), PO_T(11)$ | O, Ro |
| $PO_F(9)$ | $PO_T(3), PO_T(10)$ | G, V |
| $PO_F(10)$ | $PO_T(4), PO_T(9)$ | Br, Y |
| $PO_F(11)$ | $PO_T(5), PO_T(8)$ | S, Bk |
| $PO_F(12)$ | $PO_T(6), PO_T(7)$ | W, R |

In order to configure or "map" the dual-wire transmit/receive electrical ports $PE_F(i)$ of MCM 20 to the dual-fiber transmit/receive optical ports $PO_F(i)$ of OIM 100, the connector ports A(i) and B(i) of connectors 70 are configured as follows:

$\{1A(1), 1A(2), 1A(3), 1A(4), 1A(5), 1A(6)\} \leftrightarrow \{2B(12), 2B(11), 2B(10), 2B(9), 2B(8), 2B(7)\}$
$\{1A(7), 1A(8), 1A(9), 1A(10), 1A(11), 1A(12)\} \leftrightarrow \{2A(12), 2A(11), 2A(10), 2A(9), 2A(8), 2A(7)\}$
$\{1B(1), 1B(2), 1B(3), 1B(4), 1B(5), 1B(6)\} \leftrightarrow \{2A(6), 2A(5), 2A(4), 2a(3), 2A(2), 2A(1)\}$
$\{1B(7), 1B(8), 1B(9), 1B(10), 1B(11), 1B(12)\}\{\leftrightarrow 2B(6), 2B(5), 2B(4), 2B(3), 2B(2), 2B(1)\}$.

This configuration is written in a more compact form as (for n=12):

$\{1A(i)\} \leftrightarrow \{2B(13-i)\}$ and $\{1A((n/2)+i)\} \leftrightarrow \{2A(13-i)\}$ for i=1 to 6
$\{1B(i)\} \leftrightarrow \leftrightarrow \{2A(7-i)\}$ and $\{1B((n/2)+i)\} \leftrightarrow \{2A(7-i)\}$ for i=1 to 6.

Trunk Configuration for "Classic" Optical Interconnection Module

Figure 12:
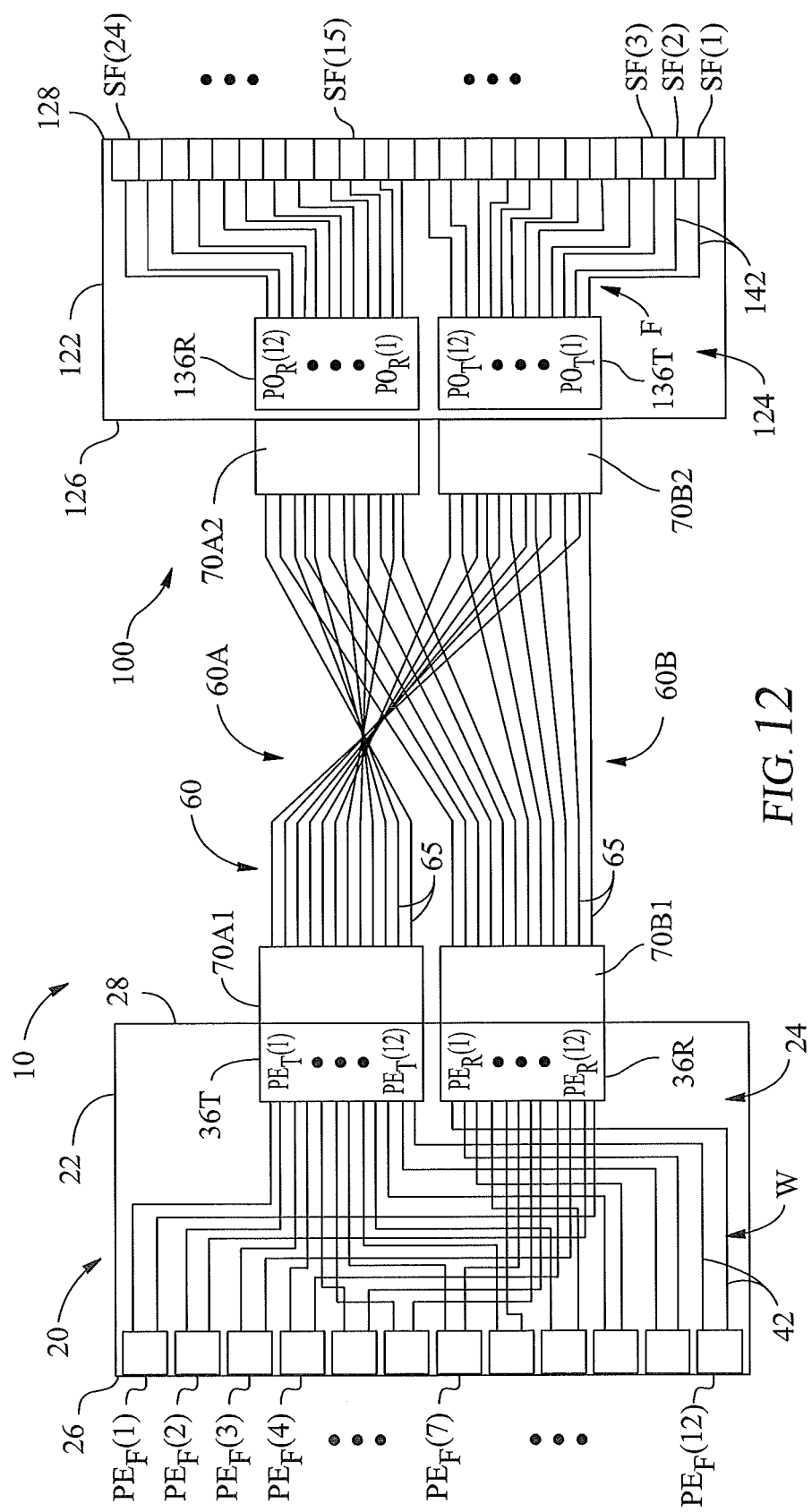
FIG. 12 is a schematic diagram of a fourth example embodiment of the hybrid E-O network of the present invention wherein the trunk cable is configured to have the correct polarity for interconnecting the MCM to a typical or "classic" LC-type OIM that includes 24 single-fiber ports, such as shown in FIG. 6.

FIG. 12 is a schematic diagram of a fourth example embodiment of hybrid E-O network 10 of the present invention, wherein trunk 60 is configured to have the correct polarity for interconnecting MCM 20 to a typical or "classic" LC-type OIM 100 that includes 24 single-fiber ports SF(i).

The configuration of fiber set F of the classic OIM 100 of FIG. 12 is defined by (for i=1 to n, where n=12):

$PO_T(i) \leftrightarrow SF(i)$ and $PO_R(i) \leftrightarrow SF(n+i)$.

The color-coding progresses as {Bu', O', G', Br', S', W', R', Bk', Y', V', Ro', Aq'} for SF(i) for i=1 to 12, and as {Bu, O, G, Br, S, W, R, Bk, Y, V, Ro, Aq} for SF(i) for i=13 to 24.

In order to configure or "map" the dual-wire transmit/receive electrical front ports $PE_F(i)$ of MCM 20 to the single-fiber ports SF(i) of OIM 100, the connector ports A(i) and B(i) of connectors 70 of trunk 60 are configured as (for i=1 to 6 and n=12):

$\{1A(i)\} \leftrightarrow \{2B(2i)\}$ and $\{1A((n/2)+i)\} \leftrightarrow \{2A(2i)\}$
$\{1B(i)\} \leftrightarrow \{2A(13-2i)\}$ and $\{1B((n/2)+i)\} \leftrightarrow \{2B(13-2i)\}$.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims.

What is claimed is:

1. An optical interconnection module for connecting to a media converter module, comprising:
   a transmitter connector having transmit ports $PO_T(i)$;
   a receiver connector having receive ports $PO_R(i)$; and
   transmit/receive ports $PO_F(i)$ that are optically connected to the transmit ports $PO_T(i)$ and the receive ports $PO_R(i)$ according to either:

a) a first port configuration defined by:
   $\{PO_F(i)\} \leftrightarrow \{PO_T(i), PO_R(13-i)\}$ for i=1 to 12; or
b) a second port configuration defined by:
   $\{PO_F(i)\} \leftrightarrow \{PO_T(12-i), PO_R(i+1)\}$ for i=1 to 12 odd (i.e., i=1, 3, 5, ... 11); and
   $\{PO_F(i)\} \leftrightarrow \{PO_T(14-i), PO_R(i-1)\}$ for i=1 to 12 even (i.e., i=2, 4, 6, ... 12).

2. The optical interconnection module of claim 1, wherein each transmit/receive port $PO_F(i)$ includes two single-fiber ports SF(i) having a configuration defined by:
   $\{SF(2i-1), SF(2i)\} \leftrightarrow \{PO_F(i)\}$.

3. The optical interconnection module of claim 2, wherein the single-fiber ports SF(i) comprise LC-type ports.

4. The optical interconnection module of claim 1, wherein the transmit ports $PO_T(i)$ and receive ports $PO_R(i)$ are optically connected to the transmit/receive ports $PO_F(i)$ via optical fibers.

5. The optical interconnection module of claim 1, further comprising:
   a housing that defines an interior region that contains the transmitter connector, the receiver connector, the transmit/receive ports $PO_F(i)$, and optical fibers that optically connect the transmit/receive ports to the transmitter connector and the receiver connector.

6. An optical fiber network, comprising:
   the optical interconnection module of claim 1; and
   a fiber optic cable that carries a first set of fibers that are optically coupled to the transmit ports $PO_T(i)$ and a second set of optical fibers that are optically coupled to the receive ports $PO_R(i)$.

7. The optical fiber network of claim 6, further comprising:
   a media converter module operably connected to the optical interconnection module via the fiber optic cable.

8. The optical fiber network of claim 7, wherein the media converter module comprises:
   an electrical-to-optical transmitter unit having transmit ports $PE_T(i)$;
   an optical-to-electrical receiver unit having receive ports $PE_R(i)$; and
   transmit/receive ports $PE_F(i)$ that are electrically connected to the electrical-to-optical transmitter unit and the optical-to-electrical receiver unit according to a port configuration defined by:
   $\{PE_F(i)\} \leftrightarrow \{PE_T(i), PE_R(13-i)\}$ for i=1 to 12.

9. The optical fiber network of claim 7, wherein the optical interconnection module is configured in the first port configuration, and wherein the fiber optic cable comprises:
   a first pair of connectors 1A and 1B respectively associated with the first and second set of optical fibers and respectively having ports 1A(i) and ports 1B(i), with connector 1A optically connected to the electrical-to-optical transmitter unit and connector 1B optically connected to the optical-to-electrical receiver unit;
   a second pair of connectors 2A and 2B respectively associated with the first and second set of optical fibers and respectively having ports 2A(i) and ports 2B(i), with connector 2A optically connected to the receiver connector and connector 2B optically connected to the transmitter connector; and
   wherein the connector pairs are configured according to a port configuration defined by:
   $\{1A(i)\} \leftrightarrow \{2A(13-i)\}$ for i=1 to 12; and
   $\{1B(i)\} \leftrightarrow \{2B(13-i)\}$ for i=1 to 12.

10. The optical fiber network of claim 7, wherein the optical interconnection module is configured in the second port configuration, and wherein the fiber optic cable comprises:
   a first pair of connectors 1A and 1B respectively associated with the first and second set of optical fibers and respectively having ports 1A(i) and ports 1B(i), with connector 1A optically connected to the electrical-to-optical transmitter unit and connector 1B optically connected to the optical-to-electrical receiver unit;
   a second pair of connectors 2A and 2B respectively associated with the first and second set of optical fibers and respectively having ports 2A(i) and ports 2B(i), with connector 2A optically connected to the receiver connector and connector 2B optically connected to the transmitter connector; and
   wherein the connector pairs are configured according to a port configuration defined by:
   $\{1A(i)\} \leftrightarrow \{2A(1+i)\}$ for i=1 to 12 odd (i.e., i=1, 3, 5, ... 11);
   $\{1A(i)\} \leftrightarrow \{2A(i-1)\}$ for i=1 to 12 even (i.e., i=2, 4, 6, ... 12);
   $\{1B(i)\} \leftrightarrow \{2B(1+i)\}$ for i=1 to 12 odd (i.e., i=1, 3, 5, ... 11); and
   $\{1B(i)\} \leftrightarrow \{2B(i-1)\}$ for i=1 to 12 even (i.e., i=2, 4, 6, ... 12).

11. The optical fiber network of claim 8, wherein the optical interconnection module is configured in the first port configuration, and wherein the fiber optic cable is configured to establish a port configuration between the electrical-to-optical transmitter and the optical-to-electrical receiver units of the media converter module and the transmitter and receiver connectors of the optical interconnection module according to a port configuration defined by:
   $\{PE_T(i)\} \leftrightarrow \{PO_R(13-i)\}$ and $\{PE_R(i)\} \leftrightarrow \{PO_T(13-i)\}$.

12. The optical fiber network of claim 8, wherein the optical interconnection module is configured in the first port configuration, and wherein the fiber optic cable is configured to establish a port configuration between the electrical-to-optical transmitter and the optical-to-electrical receiver units of the media converter module and the transmitter and receiver connectors of the optical interconnection module according to a port configuration defined by:
   $\{PE_T(i)\} \leftrightarrow \{PO_R(1+i)\}$ for i=1 to 12 odd (i.e., i=1, 3, 5, ... 11);
   $\{PE_T(i)\} \leftrightarrow \{PO_R(i-1)\}$ for i=1 to 12 even (i.e., i=2, 4, 6, ... 12);
   $\{PE_R(i)\} \leftrightarrow \{PO_T(1+i)\}$ for i=1 to 12 odd (i.e., i=1, 3, 5, ... 11); and
   $\{PE_R(i)\} \leftrightarrow \{PO_T(i-1)\}$ for i=1 to 12 even (i.e., i=2, 4, 6, ... 12).

13. The optical fiber network of claim 8, wherein the optical interconnection module is configured in the first port configuration, and wherein:
   each transmit/receive port $PO_F(i)$ includes two single-fiber ports SF(i) having a configuration defined by:
   $\{SF(2i-1), SF(2i)\} \leftrightarrow \{PO_F(i)\}$ for i=1 to 12; and
   the media converter module transmit ports $PE_T(i)$ and receive ports $PE_R(i)$ are operably connected to the single-fiber ports SF(i) according to a port configuration defined by:
   $\{PE_T(i)\} \leftrightarrow \{SF(2i)\}$ for i=1 to 12; and
   $\{PE_R(i)\} \leftrightarrow \{SF(25-2i)\}$ for i=1 to 12.

14. The optical fiber network of claim 8, wherein the optical interconnection module is configured in the second port configuration, and wherein:

each transmit/receive port $PO_F(i)$ includes two single-fiber ports $SF(i)$ having a configuration defined by:
$\{SF(2i-1), SF(2i)\} \leftrightarrow \{PO_F(i)\}$ for i=1 to 12; and
the media converter module transmit ports $PE_T(i)$ and receive ports $PE_R(i)$ are operably connected to the single-fiber ports $SF(i)$ according to a port configuration defined by:
$\{PE_T(i)\} \leftrightarrow \{SF(2i)\}$ for i=1 to 12; and
$\{PE_R(i)\} \leftrightarrow \{SF(25-2i)$ for i=1 to 12.

15. The optical fiber network of claim 8, wherein the transmit/receive ports $PE_F(i)$ comprise RJ-type ports.

16. The optical fiber network of claim 8, wherein the transmit/receive ports $PE_F(i)$ of the media converter module are operably connected to the transmit/receive ports $PO_F(i)$ of the optical interconnection module according to the configuration defined by:
$\{PE_F(i)\} \leftrightarrow \{PO_F(i)\}$.

17. A hybrid electrical-optical network, comprising:
a media converter module having transmit/receive ports $PE_F(i)$ that are electrically connected to an electrical-to-optical transmitter unit having transmit ports $PE_T(i)$ and to an optical-to-electrical receiver unit having receive ports $PE_R(i)$ according to a port configuration defined by:
$\{PE_F(i)\} \leftrightarrow \{PE_T(i), PE_R(13-i)\}$ for i=1 to 12;
an optical interconnection module having transmit/receive ports $PO_F(i)$ that are optically connected to a transmitter connector having transmit ports $PO_T(i)$ and to a receiver connector having receive ports $PO_R(i)$ according to a port configuration defined by:
$\{PO_F(i)\} \leftrightarrow \{PO_T(i), PO_R(13-i)\}$ for i=1 to 12; and
a fiber optic cable configured to optically connect the media converter module to the optical interconnection module so as to establish a port configuration defined by:
$\{PE_F(i)\} \leftrightarrow \{PO_F(i)\}$.

18. The hybrid electrical-optical network of claim 17, wherein each transmit/receive port $PO_F(i)$ is a two-fiber port that includes two single-fiber ports $SF(i)$ according to a port configuration defined by:
$\{SF(2i-1), SF(2i)\} \leftrightarrow \{PO_F(i)\}$.

19. The hybrid electrical-optical network of claim 18, wherein the media converter module transmit ports $PE_T(i)$ and receive ports $PE_R(i)$ are operably connected to the single-fiber ports $SF(i)$ according to a port configuration defined by:
$\{PE_T(i)\} \leftrightarrow \{SF(2i)\}$ for i=1 to 12; and
$\{PE_R(i)\} \leftrightarrow \{SF(25-2i)\}$ for i=1 to 12.

20. The hybrid electrical-optical network of claim 18, wherein the transmit/receive ports $PE_F(i)$ comprise RJ-type ports and the single-fiber ports $SF(i)$ comprise LC-type ports.

21. A hybrid electrical-optical network, comprising:
a media converter module having transmit/receive ports $PE_F(i)$ that are electrically connected to an electrical-to-optical transmitter unit having transmit ports $PE_T(i)$ and to an optical-to-electrical receiver unit having receive ports $PE_R(i)$ according to a port configuration defined by:
$\{PE_F(i)\} \leftrightarrow \{PE_T(i), PE_R(13-i)\}$ for i=1 to 12;
an optical interconnection module having transmit/receive ports $PO_F(i)$ that are optically connected to a transmitter connector having transmit ports $PO_T(i)$ and to a receiver connector having receive ports $PO_R(i)$ according to a port configuration defined by:
$\{PO_F(i)\} \leftrightarrow \{PO_T(12-i), PO_R(i+1)\}$ for i=1 to 12 odd (i.e., i=1, 3, 5, . . . 11); and
$\{PO_F(i)\} \leftrightarrow \{PO_T(14-i), PO_R(i-1)\}$ for i=1 to 12 even (i.e., i=2, 4, 6, . . . 12); and
a fiber optic cable configured to optically connect the media converter module to the optical interconnection module so as to establish a port configuration defined by:
$\{PE_F(i)\} \leftrightarrow \{PO_F(i)\}$.

22. The hybrid electrical-optical network of claim 21, wherein the transmit/receive ports $PO_F(i)$ are two-fiber ports that each include two single-fiber ports $SF(i)$ according to a port configuration defined by:
$\{SF(2i-1), SF(2i)\} \leftrightarrow \{PO_F(i)\}$.

23. The hybrid electrical-optical network of claim 22, wherein the media converter module transmit ports $PE_T(i)$ and receive ports $PE_R(i)$ are operably connected to the single-fiber ports $SF(i)$ according to a port configuration defined by:
$\{PE_T(i)\} \leftrightarrow \{SF(2i)\}$ for i=1 to 12; and
$\{PE_R(i)\} \leftrightarrow \{SF(25-2i)\}$ for i=1 to 12.

24. The hybrid electrical-optical network of claim 22, wherein the transmit/receive ports $PE_F(i)$ comprise RJ-type ports and the single-fiber ports $SF(i)$ comprise LC-type ports.

* * * * *